(12) United States Patent
Hintzen

(10) Patent No.: US 6,364,367 B1
(45) Date of Patent: Apr. 2, 2002

(54) WELDABLE CLAMP FOR A PIPE MADE OF THERMALLY WELDABLE MATERIAL

(75) Inventor: Werner Hintzen, Köln (DE)

(73) Assignee: Manibs Spezialarmaturen GmbH & Co. KG, Remscheid (DE)

( * ) Notice: Subject to any disclaimer, the term of this patent is extended or adjusted under 35 U.S.C. 154(b) by 0 days.

(21) Appl. No.: 09/564,159

(22) Filed: May 3, 2000

Related U.S. Application Data

(63) Continuation of application No. PCT/EP98/06585, filed on Oct. 17, 1998, now abandoned.

(30) Foreign Application Priority Data

Nov. 3, 1997 (DE) .......................................... 197 48 342

(51) Int. Cl.[7] .................................................. F16L 13/02
(52) U.S. Cl. ..................... 285/21.1; 285/21.2; 285/197; 285/423
(58) Field of Search ................................. 285/197, 21.1, 285/21.2, 373, 423

(56) References Cited

U.S. PATENT DOCUMENTS

| | | | |
|---|---|---|---|
| 2,690,193 A | | 9/1954 | Smith |
| 3,987,276 A | * | 10/1976 | Vogelsanger et al. ....... 285/21.1 |
| 4,449,038 A | * | 5/1984 | Reich et al. ................. 285/21.1 |
| 4,455,482 A | * | 6/1984 | Grandclement ............. 285/21.1 |
| 4,515,177 A | * | 5/1985 | Thalmann et al. .......... 285/21.1 |
| 4,655,480 A | * | 4/1987 | Thalmann ................... 285/21.1 |
| 4,894,521 A | * | 1/1990 | Evans ......................... 285/286 |
| 5,104,468 A | * | 4/1992 | de Jong ...................... 285/21.1 |
| 5,601,315 A | * | 2/1997 | Bunger et al. .............. 285/21.2 |

FOREIGN PATENT DOCUMENTS

| | | | | |
|---|---|---|---|---|
| CH | 528697 | * | 11/1972 | ................ 285/21.1 |
| DE | 296 16 864 U1 | | 1/1997 | |
| EP | 145581 | * | 6/1985 | ................ 285/21.1 |
| EP | 0438990 | | 7/1991 | |
| JP | 173483 | * | 6/1999 | ................ 285/21.1 |
| JP | 154897 | * | 6/2000 | ................ 285/21.1 |

* cited by examiner

Primary Examiner—Eric K. Nicholson
(74) Attorney, Agent, or Firm—Friedrich Kueffner

(57) ABSTRACT

A clamp of a thermally weldable material for a pipe of a thermally weldable material has two segments surrounding the pipe in a position of use of the clamp. The segments have heating mats of heatable electrical conduits integrated into inner surfaces of the segments. Each segment has two border edges facing one another in the position of use and clamped to one another by fastening elements. A first border edge of each segment has at least one segment flap projecting past the first border edge, and the second border edge has at least one pocket recessed relative to the second border edge. Segment flaps and pockets are complementary to the segment flaps and pockets of the opposed segment in the position of use. The heating mats have projecting flaps integrated into the area of the segment flaps and gaps in the area of the pockets. The segment flaps have a uniform thickness over their entire length and portions thereof have such a minimal thickness relative to the flap of the heating mat that, upon heating, the weldable material softens and melds in the inner contact zone between the circumferential surface of the pipe and the inner surface of the segment flap as well as in the outer contact zone between the outer surface of the segment flap and the inner surface of the pocket of the neighboring segment. After cooling a welding connection on both sides of the segment flap results.

12 Claims, 8 Drawing Sheets

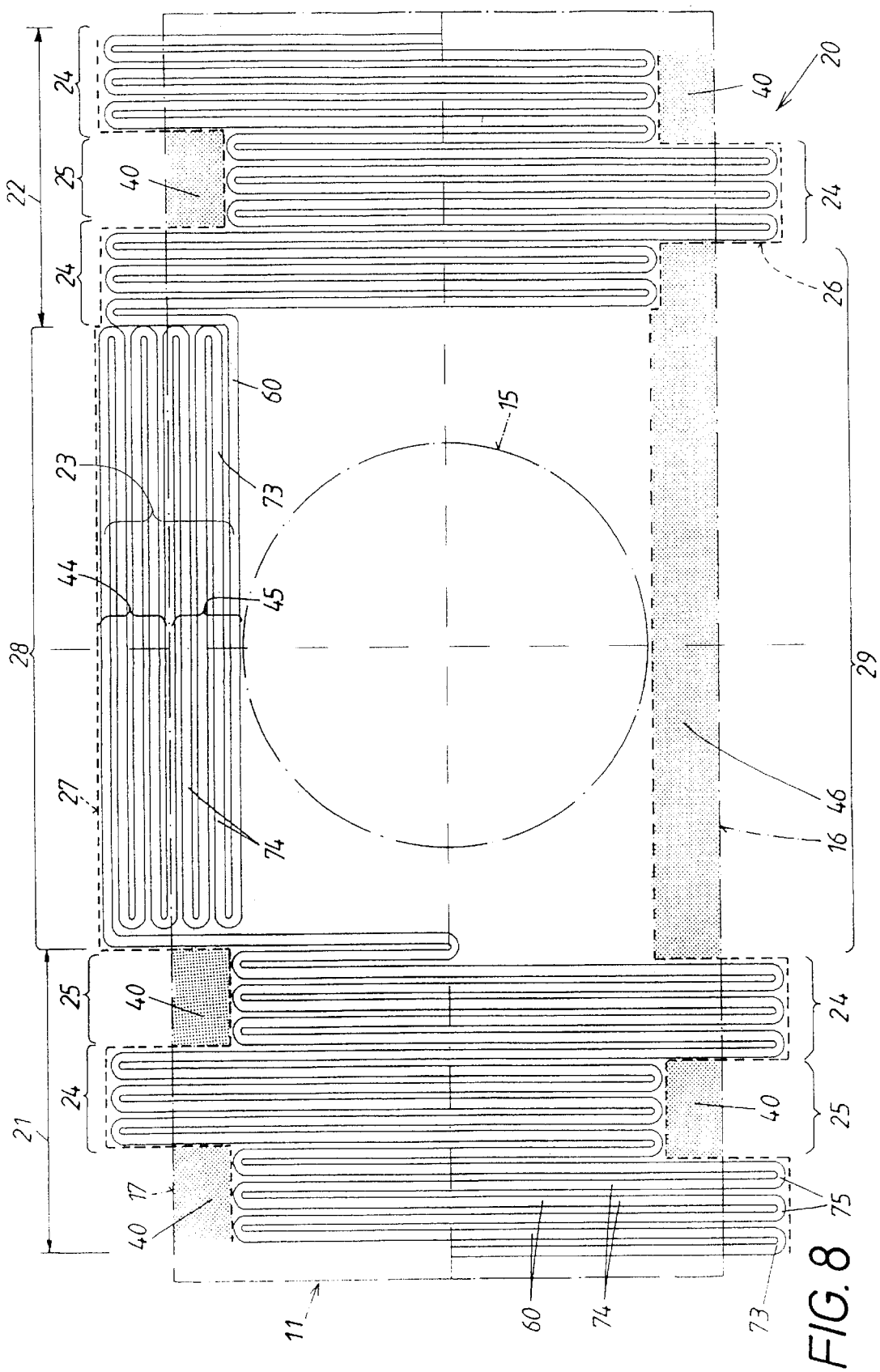

WELDABLE CLAMP FOR A PIPE MADE OF THERMALLY WELDABLE MATERIAL

This is a continuation of International Application PCT/EP98/06585, with an international filing date of Oct. 17, 1998, now abandoned.

BACKGROUND OF THE INVENTION

1. Field of the Invention

The invention relates to a clamp, such as a repair clamp, comprised of thermally weldable material for a pipe also comprised of weldable material. The clamp comprises at least two segments surrounding in its position of use the pipe wherein, if needed, at least one segment has a branch pipe. The clamp has heating mats of electrically heatable conduits which are integrated into the inner surfaces of the segments. In a position of use the segments have facing border edges which can be fastened to one another by applying pressure. Each one of the two border edges of each segment has, on the one hand, at least one segment flap projecting past the border edges at least at portions thereof and, on the other hand, a pocket recessed relative to the border edges for receiving the segment flap. These segment flaps and pockets at the two neighboring bordering edges of two segments positioned adjacent to one another in the position of use provide complementary profiles. The heating mats have a corresponding contour profile comprised of at least one projecting flap which is integrated in the area of the segment flap and at least one gap in the area of the pocket of the segments.

2. Description of the Related Art

Such clamps are used in order to provide a pipe, already in use and under pressure by a medium, subsequently with a branch line. For this purpose, clamps are used which in have a branch pipe at least at one of its cylindrical segments surrounding the pipe. This branch pipe serves initially for drilling into the pipe but then also for guiding the medium into the branch line to be connected to the branch pipe. In other cases where the pipe has a defect, a clamp of segments without a branch pipe is placed onto the pipe for the purpose of repairing the pipe.

In the known clamp (DE 296 16 864) of the kind discussed above, the flaps are of a wedge-shaped design and have at their foot area a greater cross-sectional thickness than at their head area. Such flaps are stable but welding problems result, when in use, upon heating of the weldable material by heating mats. When the heating mat is positioned in the vicinity of the inner surface of the flap, the connection to the pipe is satisfactory in this area, but at the outer surface of the flap adjacent to the inner surface of the pocket no satisfactory welding connection results.

For connecting a shrink-to-fit clamp between the neighboring mantle pipes of a pipeline, a band-shaped heating mat is inserted into the gap between the mantle pipe, on the one hand, and the shrink-to-fit clamp pushed thereon (DE 37 20 577 A1) wherein the abutting ends at the end of the band of heating mat are recessed relative to one another in a stepwise manner and mesh with one another in a comb-like fashion in the position of use. The heating mat is a separate component which is placed as a loose band annularly about the mantle pipe and produces a double layer welding connection, i.e., with the circumferential surface of the mantle pipe and also with the inner surface of the shrink-to-fit clamp. Sealing problems resulting from of a clamp design comprised of at least two cylindrical segments do not occur.

In a clamp of a different kind (EP 0 438 990 A) the two segments are provided with flanges extending in the longitudinal direction which at their contact surfaces are provided with pins with different cross-sectional profiles. These pins are probably provided to prevent an undesirable rotational position of one segment relative to the other. The flanges of the two segments are pressed against one another via gliding elements with conical profiles. This requires a certain orientation of the segments. The flanges have no flaps projecting past them and no pockets for the flaps. Accordingly, the pins have no protective function.

SUMMARY OF THE INVENTION

It is an object of the present invention to develop a clamp of the aforementioned kind which provides an especially high media sealing action of its welding locations while requiring a minimal constructive expenditure and minimal heating energy.

In accordance with the present invention, this is achieved in that the segment flap has at least in areas thereof such a minimal segment flap thickness relative to the heating mat integrated into the segment flap that, when in use, the weldable material upon heating will soften and meld not only in the area of the inner contact zone between the circumferential surface of the pipe and the inner surface of the segment flap but also in the area of the outer contact zone between the outer surface of the segment flap and the inner wall of the pocket so that, after cooling, a welding connection on both sides of the segment flap results, and in that the segment flap has a uniform segment flap thickness over its entire segment flap length.

When in use, the heat produced in the heating mat integrated into the segment flap reaches the inner surface as well as the outer surface of the segment flap due to the minimal segment flap thickness, so that at these locations such high temperatures result that a welding connection on both sides of the segment flap is produced. This is especially true when the segment flap thickness is substantially uniform over the entire length of the segment flap. Even though only a single layer heating mat is used, a welding connection results not only in the contact zone between the inner surface of the segment flap and the circumference of the pipe but also in the outer contact zone between the outer surface of the segment flap and the inner wall of the pocket. Accordingly, with minimal constructive expenditure a flawless welding connection is produced also in those areas of the segments in which no heating mat is positioned, i.e., in the area of the pockets where the heating mat has gaps.

The minimal segment flap thickness produces a good radial elasticity for a deflecting movement of the segment flap upon placement of the segments onto the pipe. This is especially true for two-segment clamps wherein the two segments, viewed in cross-section, have a semi-circular profile with the segment flaps projecting therefrom. The minimal segment flap thickness requires a careful treatment of the segment flaps especially during transport and storage of the clamp.

In order to prevent a deformation of the segment flaps beyond the limits of elasticity and to thus prevent breakage of the integrated flaps of the heating mat, it is suggested according to a further development to provide at the flanges of the segments extending in the longitudinal direction protective pins which have a length that is greater than that of the segment flaps. When the segments are supported on a support surface, the segments rest on the protective pins while the segment flaps do not come into contact with the support surface and thus cannot be deformed. By providing several protective pins a "basket" surrounding the projecting segment flap(s) is provided which, even when a dropped segment impacts on the ground, will protect the segment flaps against damage.

It is advantageous to use these protective pins at the same time for guiding purposes during mounting of the segments in that the pins are allowed to penetrate matching bores in the opposed flange of the neighboring segment. This provides simultaneously an ideal guiding action during mounting of the segments.

Further measures and advantages of the invention result from the following description in connection with the drawings illustrating one embodiment. The flaps and pockets shown in the drawings can be provided in any desired number.

BRIEF DESCRIPTION OF THE DRAWING

In the drawing:

FIG. 8 is a planar developed view of the heating mat on the concave inner surface of the segments of FIGS. 1 through 7, showing especially the contour profile as well as the winding course of the electrical conduit used for its construction.

DESCRIPTION OF THE PREFERRED EMBODIMENTS

Figure 1:
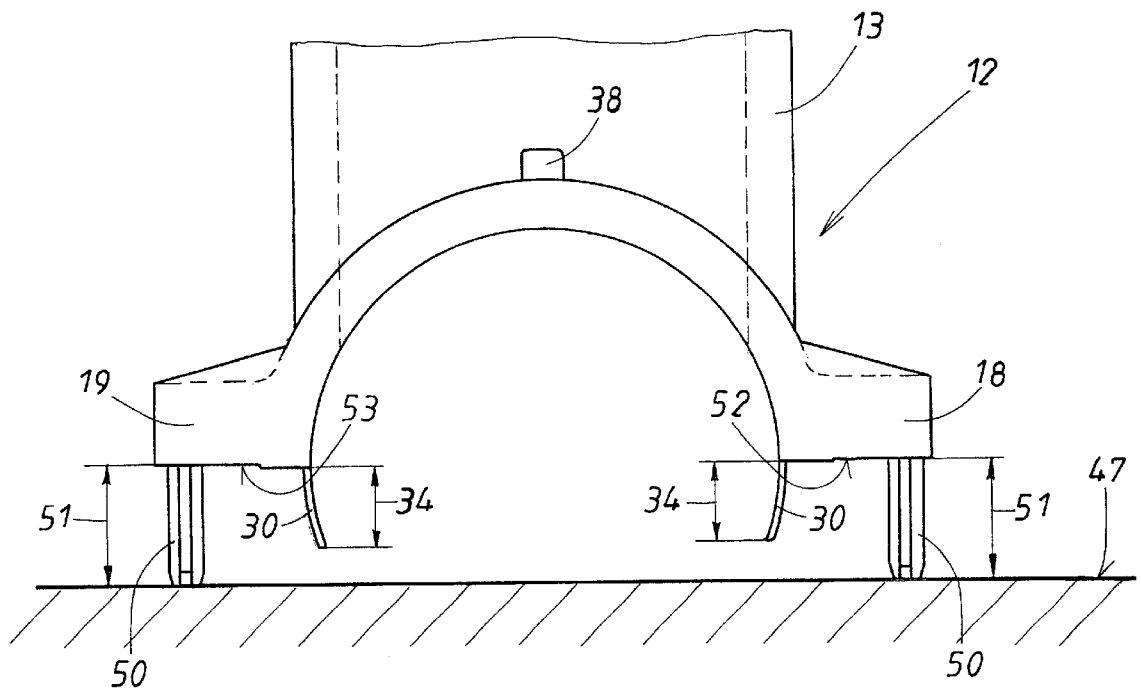
FIG. 1 is an end view of a segment of a two-segment clamp according to the invention, shown during storage before use.

The clamp is comprised of two cylindrical segments 11, 12 which are connected by welding to the pipe 10 at the desired location in the position of use. One segment 12 has a branch pipe 13. Such a branch pipe 13 could be omitted or such a branch pipe 13 could be provided on each one of the segments 11, 12. The two segments 11, 12 are of identical shape relative to one another, so that it is sufficient to describe in more detail the special configuration with the aid of segment 11 of FIG. 7. Each segment 11, 12 is delimited by two border edges 16, 17 where longitudinally extending radially projecting flanges 18, 19 are located. Narrow segment flaps 30 project past each one of the two border edges 16, 17 at least over portions of the edges 16, 17 in the end areas of the two segments 11, 12, and a wider segment flap 36 is provided in the central area of the segments 11, 12. Correspondingly dimensioned pockets 40, 46 are arranged in an alternating arrangement with these segment flaps 30, 36 which, in an analogous manner, are recessed relative to the border edges 16, 17 of the two segments 11, 12. The two pockets 40, 46 are sized to match the dimensions of the two segment flaps 30, 36. Accordingly, complementary toothing profiles 81, 82 are provided at the two border edges 16, 17.

Figure 2:
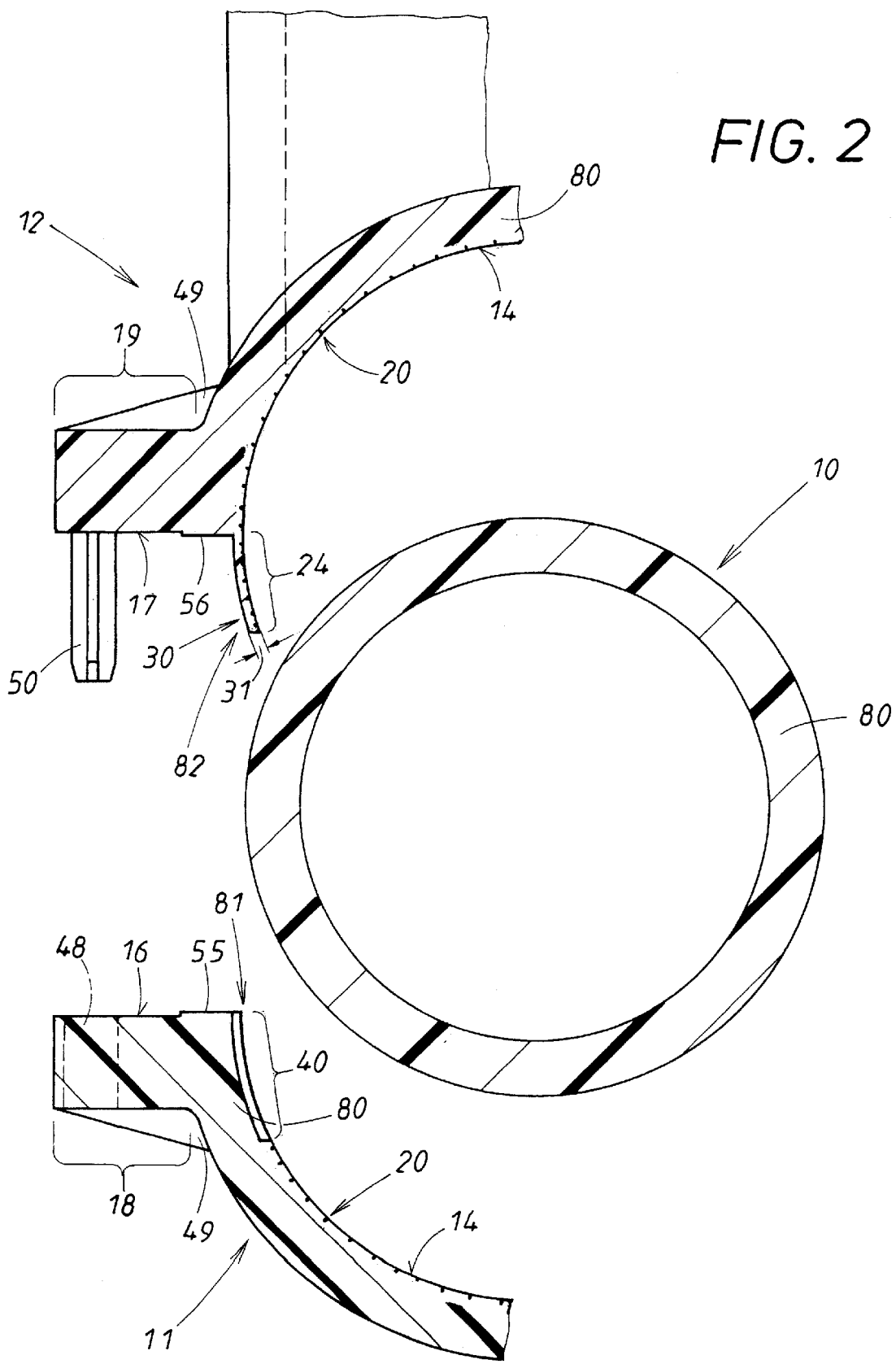
FIG. 2 shows in a cross-sectional and in a broken-away illustration the two segments of the clamp according to the invention before mounting on a pipe, wherein the position of the section line can be seen in the perspective view of the lower segment in FIG. 7 (section line II—II)
Figure 3:
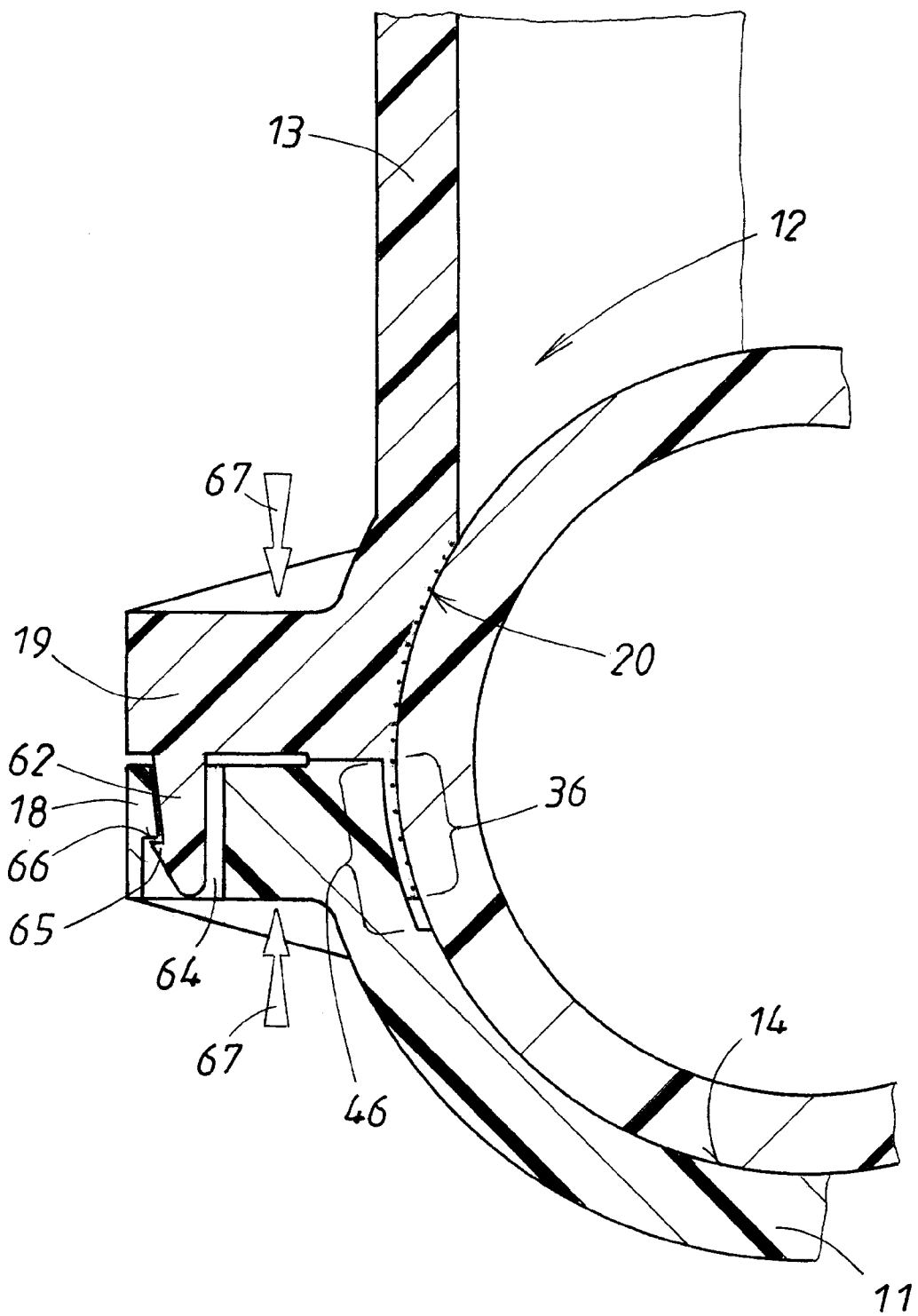
FIG. 3 is a sectional view corresponding to that of FIG. 2, showing the segments of the clamp after their mounting on the pipe, wherein the position of the section line can be seen in the view of the lower segment in FIG. 7 (centrally shown section line III—III)
Figure 4:
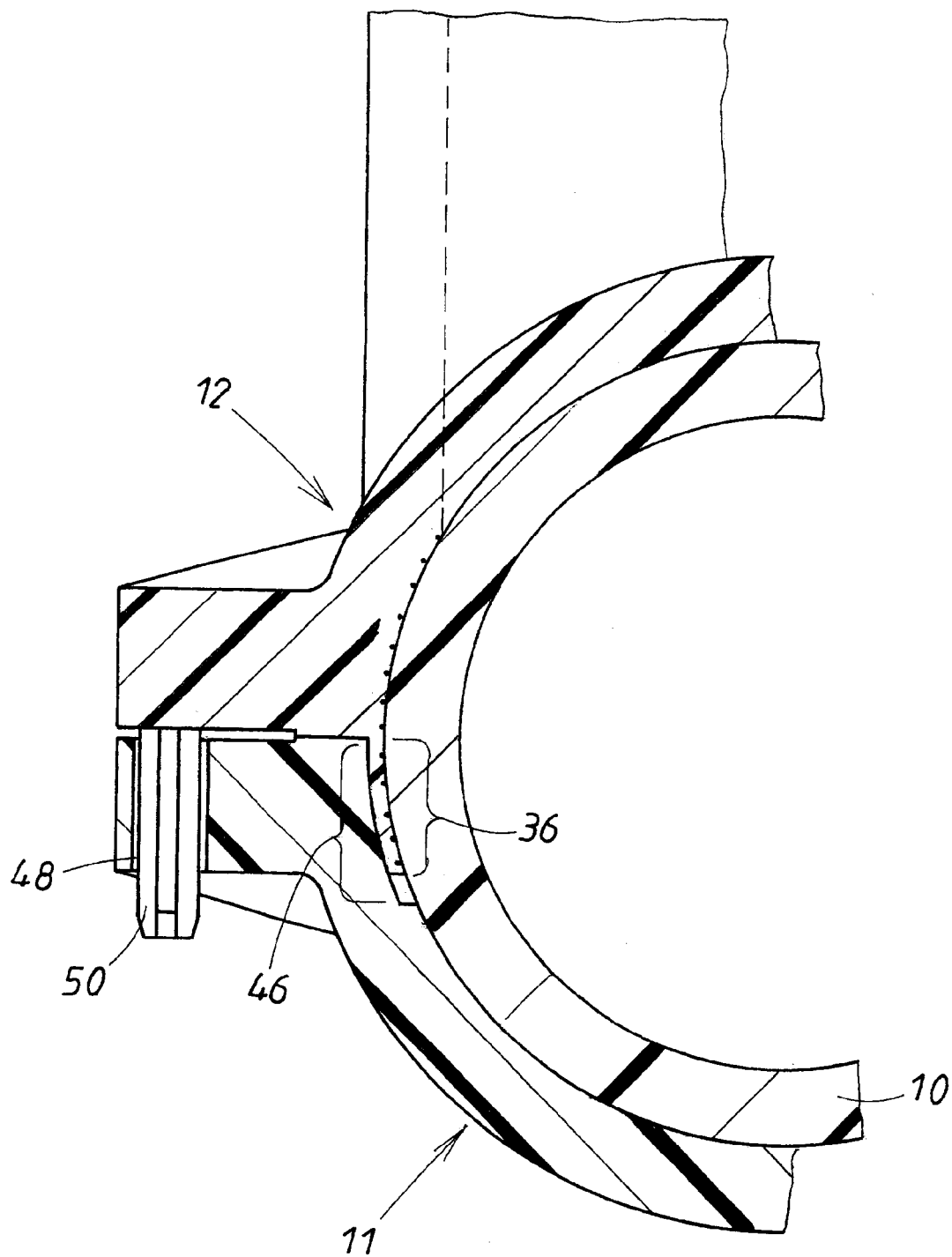
FIG. 4 is a representation analog to FIG. 3 showing the cross-section of the segments fastened on the pipe, wherein the position of the section line can be seen in the view of the lower segment in FIG. 7 (section line IV—IV)
Figure 5:
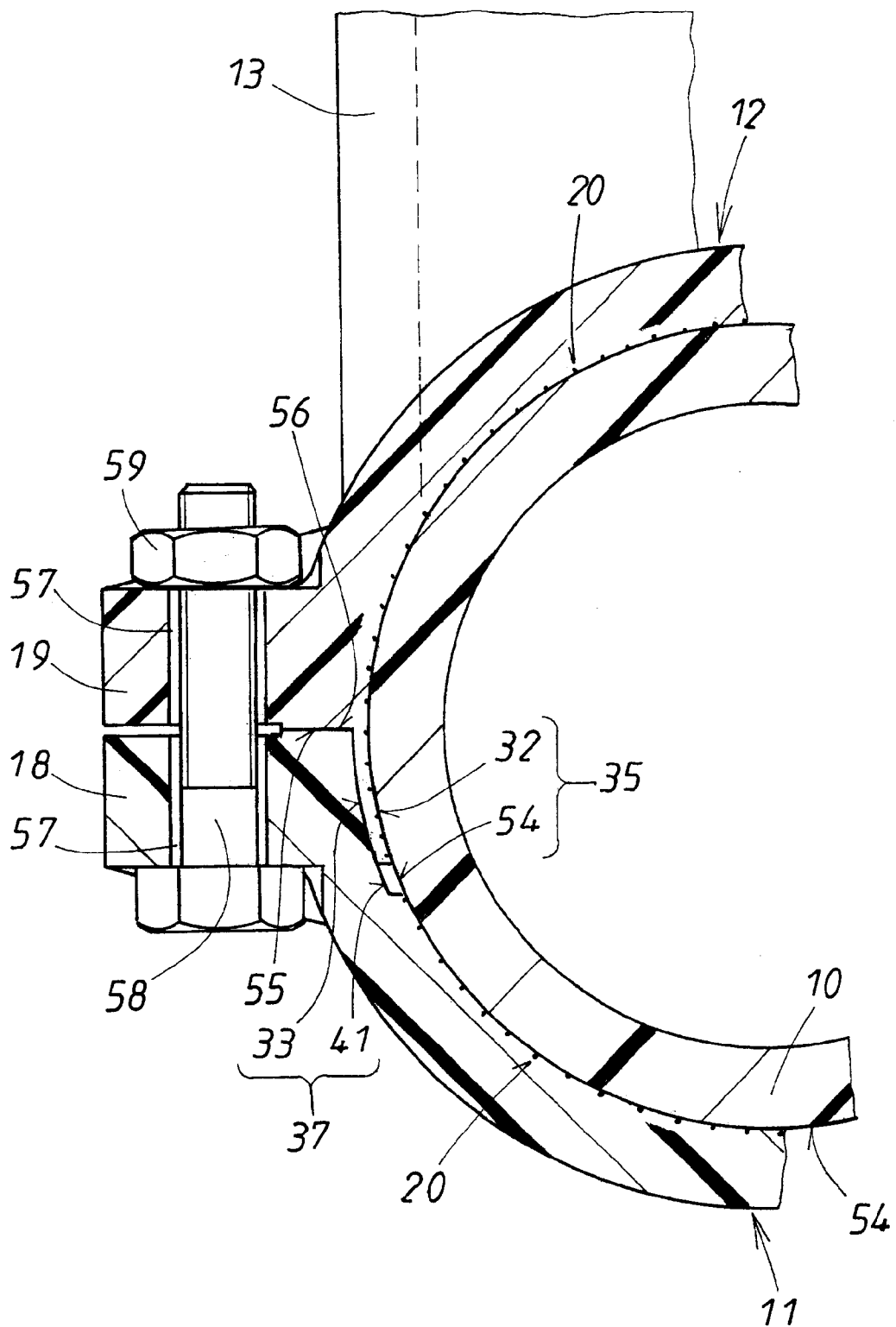
FIG. 5 is a further cross-sectional view analog to FIGS. 3 or 4, wherein the position of the section line can be seen in the view of the lower segment in FIG. 7 (section line V—V)
Figure 7:
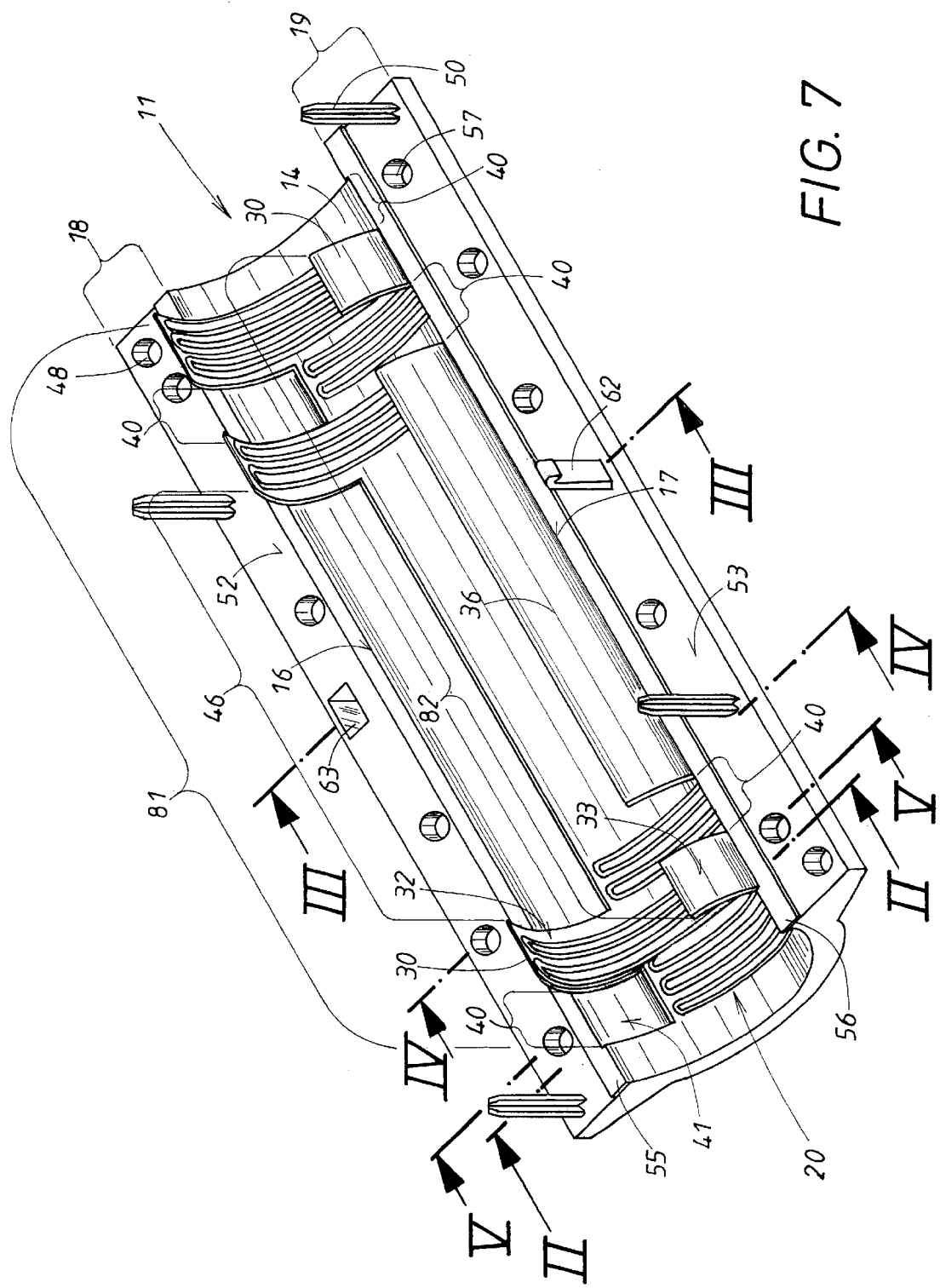
FIG. 7 is a perspective view of the aforementioned lower segment of FIG. 1, in a viewing direction onto the concave inner segment surface.

When the two segments 11, 12 are used in the mirror-symmetrical manner illustrated in FIG. 2, the two border edges 16, 17 are positioned opposite one another in the position of use so that complementary toothing profiles 81, 82 can cooperate with one another, as illustrated in the fastened state shown in FIG. 3 through FIG. 5. In the position of use, the segment flaps 30, 36 of the two toothings 81, 82 of the two segments 11, 12 engage alternatingly the correspondingly arranged pockets 40, 46. This can be seen by means of the diverse cross-sections (FIGS. 2 through 5) along the section lines II, III, IV, and V of FIG. 7 illustrating further details.

Figure 6:
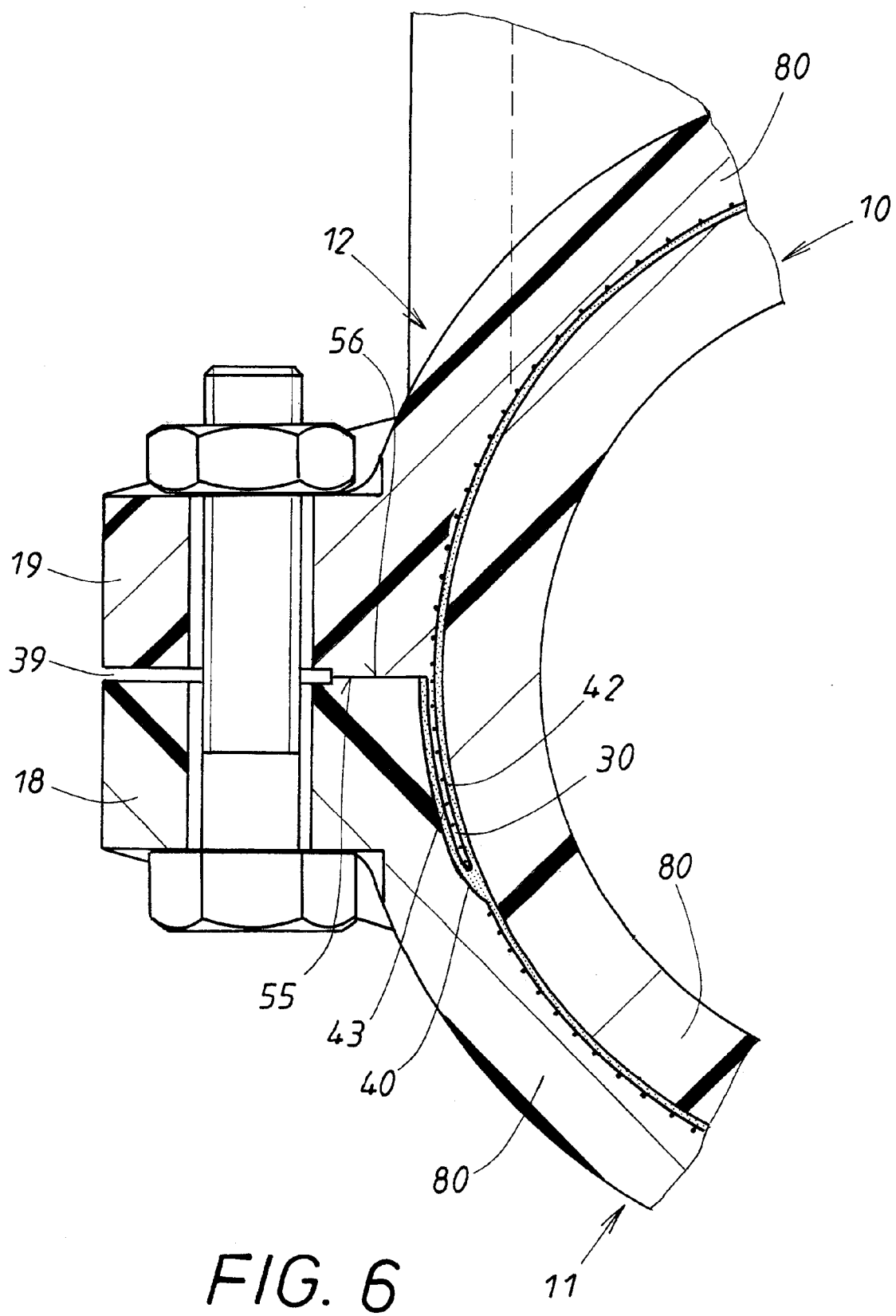
FIG. 6 shows an enlarged detail of FIG. 5 after completion of the welding process.

In a position of use, the flanges 18, 19 are secured in pairs with one another. In the final fastening state according to FIG. 5, the fastening elements are respective bolts 58 and nuts 59. As can be seen best in FIG. 7, at the two inner surfaces 52, 53 of the two flanges 18, 19 stop elements in the form of axial abutment ledges 55, 56 are provided which are positioned radially adjacent to the segment flaps 30, 36 projecting past the inner surfaces and the openings of the pockets 40, 46. In the position of use according to FIG. 5, the two abutment ledges 55, 56 rest against one another. Because of the pressing action of the fastening elements 58, 59 acting on the segments 11, 12, a sealing action is achieved which is important for the welding process to be disclosed in more detail in connection with FIG. 6.

A heating mat 20 is integrated respectively in the concavely designed inner surfaces 14 of the two segments 11, 12. A planar developed view of the heating mat 20 is illustrated in FIG. 8. FIG. 8 shows in dash-dot lines the contour of the segments 11 and the position of the longitudinal edges 16, 17, also shown as a developed view. The special characteristic of the heating mat 20 is that it has along these border edges 16, 17 a structured contour 26, 27 which is emphasized in the drawing FIG. 8 by dashed lines. The contour profile 26 is complementary to the contour profile 27. This results in narrow flaps 24 and broad flaps 28 which project past the border edges 16, 17 and in interposed narrow gaps 25 and broad gaps 29 which are recessed relative to the border edges 16, 17. The heating mat 20 is comprised of a heating strand 60 arranged in windings whose course is illustrated in FIG. 8. The strand 60 will be explained in more detail infra. This winding course of the heating strand 60 is fixed by a plastic layer, and this pre-product is then arranged during injection molding of the final product at the inner surface of the injection mold used for forming the segments 11, 12. Both segments 11, 12 are comprised of a weldable material 80, and this is also the case for the pipe 10. Accordingly, the flaps 24, 28 of the heating mat 20 will be positioned in the area of the segment flaps 30, 36 while the gaps 25, 29 are arranged in the area of the correspondingly dimensioned pockets 40, 46. The position of these pockets 40, 46 is illustrated in FIG. 8 by a dotted hatching.

When the segments 11, 12 provided with such heating mats 20 are placed about the pipe 10 according to FIG. 3, annularly closed heating sleeves result because of the winding course of the end sections 21, 22 illustrated in FIG. 8. The sleeves are connected by two longitudinally extending heating strips 23. These heating sleeves and heating strips 23 are formed by a corresponding winding course of the heating strand 60. These heating strips 23 extend, when mounted, with one strip half 44 into the area of the broad segment flap 36, shown in FIG. 7, of the respective segments 11, 12 while the other strip half 45 is positioned respectively below the border edge 17. This arrangement is realized in order to keep the central zone for the through opening 15, indicated by dashed lines in FIG. 8, of the branch part 13 free of heating mat portions.

Figure 9:
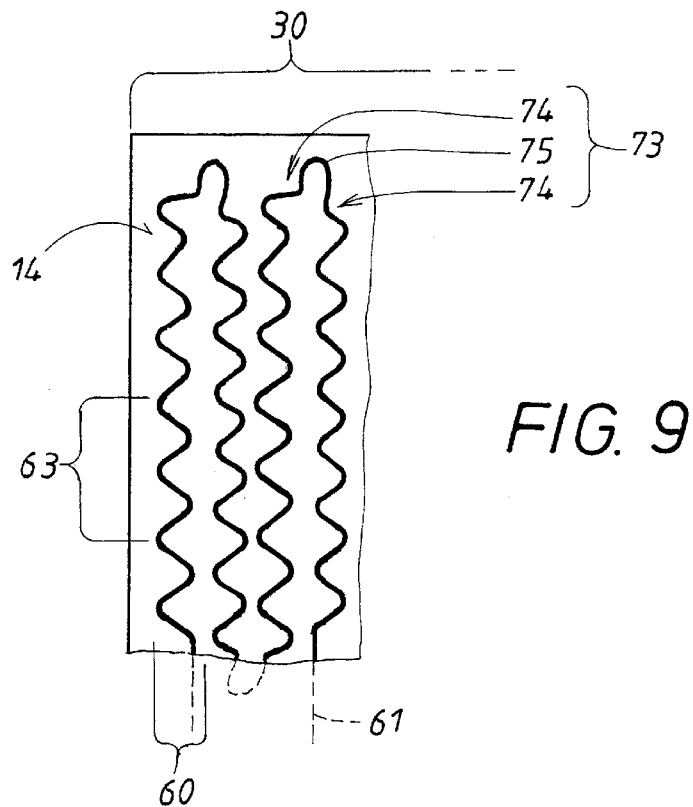
FIG. 9 shows on a greatly enlarged scale a corner area of the segment flap shown in FIG. 7 with integrated flap of the heating mat shown in FIG. 8.

In FIG. 2, the heating mat 20 arranged at the inner surface 14 is illustrated simply by the dotted cross-sections of the electrical conduit 61 in FIG. 9. As mentioned before, the heating mat flap 24 is positioned in the interior of the respective segment flap 30. The segment flaps 30 have a relatively minimal segment flap thickness 31. In the present embodiment the uniform segment flap thickness 31 is provided over the entire segment flap length as illustrated in FIG. 1. The same holds true also for the disclosed broad segment flap 36. In the position of use, with the segments 11, 12 finish-mounted on the pipe 10 as shown in FIG. 5, two contact zones 35, 37 result at the segment flap 30 or 36. The inner contact zone 35 is the result of areal contact between the inner segment flap surface 32 and the circumferential surface 54 of the pipe 10. The outer contact zone 37 is the result of contact between the outer segment flap surface 33 and the inner wall 41 of the pocket whose position is also illustrated in FIG. 7.

The aforementioned electrical conduit 61 of the heating mat 20 integrated into each segment 11, 12 has electrical contacts 38 in the area of the segment ends which is illustrated in FIG. 1. An electrical power supply is connected to these electrical contacts 38, and this causes electrical heating of the heating mats 20. Because of the at least partially minimal segment flap thickness 31, the aforementioned contacting surfaces are not only melted at the inner contacts surface 37. Softened material 80 is produced between the segments 11, 12 and the pipe 10, as indicated by the dotted hatching in FIG. 6, on both sides of the segment flap 30 engaged in the pocket 40. The material 80 melds, and, after cooling, an inner and outer welding connection 42, 43 is produced on both sides of the segment flap 30. The abutment ledges 55, 56 securely pressed against one another by the fastening elements 58, 59 prevent the liquid material 80 from flowing out of the gap 39 between the two flanges 18, 19.

FIG. 9 shows on an enlarged scale a corner portion of the segment flap 30 in a plan view onto the inner surface 14 of the corresponding segment 11 or 12. More details of the aforementioned heating strand 60, only schematically indicated in the previous drawings, are illustrated. The heating strand 60 is comprised of a wave-shaped planar extension of a heating conduit 61. This planar wave-shaped course 63 is a "meander". The element that has been referred to previously as "heating strand" is thus a meander-shaped, winding conduit 61. The thus formed heating strand 60 is now placed, as illustrated in a simplified manner in FIG. 8, in narrow windings 73. This results in parallel legs 74 with interposed directional reversal locations 75.

As can be seen best in FIG. 1 and FIG. 7, the two flanges 18, 19 are provided with several protective pins 50 which project past the aforementioned inner flange surfaces 52, 53. These protective pins 50 have a greater pin length 51 than the projecting length 34 of the circularly curved segment flaps 30 or 36. When the segment, as illustrated in FIG. 1, impacts on a hart surface 47, the end faces of the protective pins 50 will absorb the impact. No deformation of the segment flaps 30, 36 results. The pins 50 thus provide a protective function and prevent damage of the projecting segment flaps 30, 36. As can be seen in FIGS. 2 and 7, the protective pins 50 in one of the flanges 19 of the segment 12 has complementary bores 48 in the cooperating opposite flange 18 of the respectively opposed segment 11 in an arrangement pattern corresponding to and complementing the position of the pins 50. Accordingly, the protective pins 50 take over a further function, i.e., upon assembly of the segments 11, 12 they provide a guiding action in cooperation with the bores 48. This results in a mutual centering of the two segments 11, 12 which ensures that the segment flaps 30, 36 on both sides of the segments are inserted property into the corresponding openings of the pockets 40, 46. Accordingly, by means of the protective pins 50 an exact mounting of the clamps preventing damage to the segment flaps 30, 36 is ensured.

In order to facilitate mounting of the two segments 11, 12, complementary closure elements 62, 63 are provided which are illustrated in FIG. 7. They form a snap connection and, upon mounting of the two segments 11, 12, they will engage one another. As shown in FIG. 3, this results in a preliminary fastening action of the segments 11, 12 to one another and to the pipe 10. One of the closing elements 62 is comprised of a hook member 62 at the inner flange 19 which, according to FIG. 7, projects past the inner flange surface 53. The complementary other closing element 64, shown in FIG. 7, at the other flange 18 is comprised of an opening 64. In the case of coupling, according to FIG. 3, the hook member 62 with its hook head 65 engages the opening 64 and engages behind a step 66 provided in the opening 64. The dimensions of the hook member 62 and of the stepped configuration 66 of the opening 64 are selected such that, when the hook head 65 snaps into place, a compression force illustrated by the arrow 76 forces the two segments 11, 12 against one another, on the one hand, and the inner segment surfaces 14 against the pipe 10, on the other hand. Accordingly, with a simple snap connection mounting and fastening of the components 10, 11, 12 is ensured before the aforementioned fastening elements 58, 59 are positioned or even actuated.

For placing the bolts 58, as can be seen in FIGS. 5 and 7, the two flanges 18, 19 are provided with pairs of aligned bores 68 in the position of use. Upon tightening the nuts 59 on the bolts 58, an increase of the aforementioned pressing action between the components 10, 11, 12 results naturally. In order to increase the stiffness of the flanges 18, 19, they are, at some locations thereof, provided with radial reinforcement ribs 49 at the outer flange surfaces.

While specific embodiments of the invention have been shown and described in detail to illustrate the inventive principles, it will be understood that the invention may be embodied otherwise without departing from such principles.

LIST OF REFERENCE NUMERALS 10 pipe
11 lower segment
12 upper segment
13 branch pipe on 12
14 concave inner surface of 11 or 12
15 through opening in 20 for 13
16 first border edge of 11, 12
17 second border edge of 11, 12
18 first flange at 16
19 second flange at 17

20 heating mat for 14
21 first end portion of 20
22 second end portion of 20
23 heating strip between 21, 22
24 narrow flap of 20
25 narrow gap of 20
26 first line of the contour profile of 20
27 second line of the contour profile of 20
28 broad flap of 20
29 broad gap of 20
30 narrow segment flap at 24 of 11, 12
31 segment flap thickness of 30 or 36
32 inner segment flap surface
33 outer segment flap surface
34 length of segment flap (FIG. 1)
35 inner contact zone of 30, 36 with 41, 45
36 broad segment flap at 28
37 outer contact zone of 30, 36 with 41, 54
38 electrical contact location for 61 on 20 (FIG. 1)
39 gap between 16, 17 (FIG. 6)
40 narrow pocket of 11, 12 at 25 of 20
41 inner wall of pocket 40 or 46
42 inner welding connection of 30, 36 (FIG. 6)
43 outer welding connection of 30, 36 (FIG. 6)
44 first strip half of 23
45 second strip half of 23
46 broad pocket in 11 or 36 at 29 of 20
47 hard ground surface (FIG. 1)
48 bore for 50
49 reinforcement ribs at 18, 19 (FIG. 2)
50 protective pin
51 pin length of 50
52 inner surface of 18
53 inner surface of 19
54 circumferential surface of 10
55 abutment ledge on 18
56 abutment ledge on 19
57 bore in 18, 19 (FIG. 5)
58 fastening element, bolt
59 fastening element, nut
60 heating strand in 20
61 electrical conduit in 60
62 closure element on 19, hook member (FIG. 3)
63 meander of 61 in 60, wave shape course of 61
64 complementary closure element, opening in 18 for 62 (FIG. 3)
65 hook head of 62 (FIG. 3)
66 step in 64 (FIG. 3)
67 compression force arrow between 18, 19 (FIG. 3)
73 winding of 60
74 parallel leg of 73 (FIG. 8)
75 directional reversal location between 74 (FIG. 8)
80 weldable material of 10, 11, 12
81 toothing profile of 11 or 12 at 16
82 complementary toothing profile of 12, 11 at 17

What is claimed is:

1. A clamp of a thermally weldable material for a pipe of a thermally weldable material, the clamp comprising:
    at least two segments surrounding a pipe in a position of use of the clamp;
    the segments having heating mats comprised of heatable electrical conduits integrated into inner surfaces of the segments;
    each of the segments having two border edges facing one another in the position of use, wherein the border edges are configured to be connected to one another when pressure is applied;
    wherein a first one of the two border edges of each segment has at least one segment flap projecting past the first border edge and wherein a second one of the two border edges has at least one pocket recessed relative to the second border edge, wherein the segment flaps and the pockets of each segment are configured to be complementary to the segment flaps and the pockets of the opposed segment in the position of use;
    wherein the heating mats have a contour comprised of at least one projecting flap integrated into the segment flaps and at least one gap where the pockets are located;
    wherein the segment flaps have a uniform thickness over an entire length of the segment flap and have such a minimal thickness relative to the integrated flap of the heating mat that in the position of use, upon heating, the weldable material softens and melds not only within an inner contact zone between the circumferential surface of the pipe and the inner surface of the segment flap but also within an outer contact zone between the outer surface of the segment flap and the inner surface of the pocket of a neighboring segment, wherein after cooling a welding connection on both sides of the segment flap results.

2. The clamp according to claim 1, wherein at least one segment has at least one branch pipe.

3. The clamp according to claim 1, wherein the segments have flanges at the border edges and wherein the flanges of the opposed segments form flange and counter flange pairs, wherein the flange and counter flange pairs receive fastening elements fastening the segments to one another and on the pipe, wherein at least one of the flanges of the flange and counter flange pair has a protective pin positioned at an inner flange surface thereof, wherein a length of the protective pin is equal to or greater than a projecting length of the segment flap, and wherein the opposing flange of the flange and counter flange pair has a matching bore configured to receive and guide the projecting pin when the segments are combined to form the clamp about the pipe.

4. The clamp according to claim 3, wherein the fastening elements are screws and nuts.

5. The clamp according to claim 3, wherein the flange and counter flange pairs have complementary closure elements configured to snap into one another and form a snap connection in order to secure at least preliminarily the segments to one another and to the pipe.

6. The clamp according to claim 5, wherein the closure elements, when snapped into one another, force the segments against the pipe.

7. The clamp according to claim 5, wherein a first one of the closure elements is a hook member with a hook head and the second one of the closure elements is an opening, wherein the hook head engages the opening to form the snap connection.

8. The clamp according to claim 7, wherein the opening has a stepped opening cross-section forming a step and wherein the hook head engages behind the step.

9. The clamp according to claim 3, wherein the flange and counter flange of the flange and counter flange pairs have facing inner flange surfaces with stop elements, and wherein in the position of use the stop elements rest against one another.

10. The clamp according to claim 9, wherein the stop elements are axial abutment ledges arranged radially between the inner flange surfaces of the flange and counter flange and between the complementary segment flaps and pockets of the segments.

11. The clamp according to claim 9, wherein the stop elements are monolithic parts of the segments.

12. The clamp according to claim 5, wherein the segment flaps, the protective pins, and the closure elements forming the snap connection are monolithic parts of the segments.

* * * * *